United States Patent
Marcé et al.

(10) Patent No.: US 11,005,783 B2
(45) Date of Patent: May 11, 2021

(54) NOTIFICATION OF TIMING MISMATCHES FOR QUEUES IN TIME SENSITIVE NETWORKING

(71) Applicant: Nokia Solutions and Networks Oy, Espoo (FI)

(72) Inventors: Olivier Marcé, Massy (FR); Brice Leclerc, Arpajon (FR); Maël Guiraud, Trappes (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/361,496

(22) Filed: Mar. 22, 2019

(65) Prior Publication Data
US 2020/0304429 A1  Sep. 24, 2020

(51) Int. Cl.
*H04L 12/861* (2013.01)
*H04L 12/935* (2013.01)

(52) U.S. Cl.
CPC .......... *H04L 49/3027* (2013.01); *H04L 49/90* (2013.01)

(58) Field of Classification Search
CPC .......................... H04L 49/3027; H04L 49/90
See application file for complete search history.

(56) References Cited

U.S. PATENT DOCUMENTS

| | | | |
|---|---|---|---|
| 10,536,959 B2 | 1/2020 | Barabell et al. | |
| 10,743,269 B2 | 8/2020 | Marce et al. | |
| 2010/0329141 A1* | 12/2010 | Apostol | H04L 47/22 370/252 |
| 2014/0006837 A1 | 1/2014 | Hann et al. | |
| 2017/0331748 A1* | 11/2017 | Mangin | H04L 47/621 |
| 2018/0183729 A1 | 6/2018 | Alsup | |
| 2018/0237039 A1 | 8/2018 | Mong et al. | |
| 2019/0007344 A1* | 1/2019 | Mangin | H04L 47/58 |
| 2019/0045246 A1 | 2/2019 | Ghangam et al. | |
| 2019/0045475 A1 | 2/2019 | Kasichainula | |
| 2019/0166061 A1* | 5/2019 | Farkas | H04L 47/245 |
| 2019/0215832 A1* | 7/2019 | Nishimura | H04L 47/624 |
| 2019/0253339 A1 | 8/2019 | Mehmedagic | |

OTHER PUBLICATIONS

Non-Final Office Action dated Jan. 21, 2020 for U.S. Appl. No. 16/199,857, 31 pages.
(Continued)

*Primary Examiner* — Kodzovi Acolatse
(74) *Attorney, Agent, or Firm* — Tong, Rea, Bentley & Kim, LLC

(57) ABSTRACT

A module monitors an arrival time of a frame at a node that selectively transmits frames from different flows in different time windows. The module determines whether the arrival time is within a time window and generates a signal in response to the arrival time being outside of the time window. In some cases, the frame is received at an ingress port of the node and the arrival time of the frame is recorded in an event database in response to receiving the frame at the ingress port. The arrival time of the event is accessed from the event database and this information is used to determine whether the arrival time is within the time window. The time window can be modified in response to the arrival time being outside the time window.

18 Claims, 8 Drawing Sheets

(56) References Cited

OTHER PUBLICATIONS

Stanton, "Distributing Deterministic, Accurate Time for Tightly Coordinated Network and Software Applications: IEEE 802.1AS, the TSN profile of PTP", IEEE Communications Standards Magazine, Jun. 2018, 34 pages.
Grossman, "Deterministic Networking Use Cases", Internet Engineering Task Force, Internet-Draft, Jun. 26, 2018, 90 pages.
"Installing Cisco IOS Software TSN Support on a Cisco IE 4000 Switch", https://www.cisco.com/c/en/us/td/docs/switches/lan/cisco_ie4000/tsn/b_tsn_ios_support/b_tsn_ios_support_chapter_0101.html, Sep. 11, 2018, 4 pages.
Pedretti et al., "Nanoseconds Timing System Based on IEEE 1588 FPGA Implementation", arXiv.org, arXiv:1806.04586v2, IEEE Transaction on Nuclear Science, Jun. 2018, 8 pages.
Nasrallah et al., "Ultra-Low Latency (ULL) Networks: the IEEE TSN and IETF DetNet Standards and Related 5G ULL Research", arXiv: 1803.07673v3, arXiv.org, Sep. 2018, 59 pages.
Notice of Allowance dated Mar. 30, 2020 for U.S. Appl. No. 16/199,857, 27 pages.

* cited by examiner

| RECORD | QUEUE | GCE | TIME |
|---|---|---|---|
| 1 | 2 | 00100011 | 85 μs |
| 2 | 5 | 00101100 | 112 μs |
| 3 | 4 | 00101100 | 504 μs |
| 4 | 4 | 11010000 | 748 μs |

NOTIFICATION OF TIMING MISMATCHES FOR QUEUES IN TIME SENSITIVE NETWORKING

BACKGROUND

Field of the Disclosure

Upcoming generations of wireless communication systems, such as Fifth Generation (5G) communication systems, are expected to enable applications such as virtual reality, augmented reality, reliable remote operation of machines, factory automation, network-assisted control of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. One key feature of 5G communication systems is Ultra-Low Latency Reliable Communication (ULLRC) that targets end-to-end latencies of 1 millisecond (ms) (e.g., to support factory automation applications) and reliabilities of at least 99.999% (e.g., for automotive traffic control applications such as platooning). Another key feature of 5G communication systems is that most of the signal processing is done in the network by cloud servers rather than close to the radio antennas that support wireless communication, e.g., with IoT devices. The cloud server architecture is referred to herein as Cloud Radio Access Network (C-RAN). The latency requirements for C-RAN are even more stringent: round trip time budgets are expected to be in the range of 200 to 500 microseconds (μs). Although described herein in the context of a 5G communication system, the C-RAN architecture is also implemented in other communication systems such as Fourth Generation (4G) communication systems. A third key feature of 5G communication systems is network slicing, which permits operators to allocate resources of all types (network, CPU, storage) to a given service, without interfering with other services provided by the system.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided. The method includes monitoring an arrival time of a frame at a node that selectively transmits frames from different flows in different time windows, determining whether the arrival time is within a time window, and generating a signal in response to the arrival time being outside of the time window.

In some embodiments of the method, the time window is indicated by a gate control list (GCL) stored in the node and determining whether the arrival time is within the time window includes accessing the GCL.

Some embodiments of the method also include configuring a first submodule to monitor an arrival time of the frame using information stored in a configuration database and configuring a second submodule to compare the arrival time to a time window for the queue using information stored in the configuration database.

Some embodiments of the method also include receiving the frame at an ingress port of the node and recording, using the first submodule, the arrival time of the frame in an event database in response to receiving the frame at the ingress port.

Some embodiments of the method also include accessing, at the second submodule, the arrival time from the event database and determining, at the second submodule, whether the arrival time is within the time window for the queue.

In some embodiments of the method, generating the signal includes generating a signal indicating an alert that the arrival time is outside the time window or an adaptation to be performed by the node in response to the arrival time being outside the time window.

Some embodiments of the method also include buffering the frame in response to the arrival time being outside the time window.

Some embodiments of the method also include modifying the time window for the queue in response to the arrival time being outside the time window.

In some embodiments, node of a communication system is provided. The node selectively transmits frames from different flows in different time windows. The node includes a port to receive a frame, a queue to hold the frame received at the port, and a module to determine whether an arrival time of the frame is within a time window for the queue and generate a signal in response to the arrival time being outside of the time window.

Some embodiments of the node include a memory configured to store a gate control list (GCL) that includes information indicating the time window for the queue and the module is configured to access the information indicating the time window for the queue from the GCL in the memory.

Some embodiments of the node include a first submodule to monitor an arrival time of the frame and a second submodule to compare the arrival time to a time window for the queue.

Some embodiments of the node include a configuration database stored in the memory and the configuration database includes information used to configure the first submodule and the second submodule.

In some embodiments, the first submodule is configured to record the arrival time of the frame in an event database in response to receiving the frame at the ingress port and the event database is stored in the memory.

In some embodiments, the second submodule is configured to access the arrival time from the event database and determine whether the arrival time is within the time window for the queue.

In some embodiments, the module is configured to generate the signal to indicate an alert that the arrival time is outside the time window or an adaptation to be performed by the node in response to the arrival time being outside the time window.

In some embodiments, the frame is buffered in the queue in response to the arrival time being outside the time window.

In some embodiments, the module modifies the time window for the queue in response to the arrival time being outside the time window.

In some embodiments, an apparatus is provided that includes at least one processor and at least one memory including computer program code. The at least one memory and the computer program code configured to, with the at least one processor, cause the apparatus at least to perform monitoring an arrival time of a frame at a queue in a node that selectively transmits frames from different flows in different time windows, determining whether the arrival time is within a time window for the queue, and generating a signal in response to the arrival time being outside of the time window.

In some embodiments, the at least one memory and the computer program code are configured to, with the at least one processor, cause the apparatus at least to perform receiving the frame at an ingress port of the node, recording the arrival time of the frame in an event database in response to receiving the frame at the ingress port, accessing the arrival time from the event database, and determining whether the arrival time is within the time window for the queue.

In some embodiments, the at least one memory and the computer program code are configured to, with the at least one processor, cause the apparatus at least to perform buffering the frame in response to the arrival time being outside the time window and modifying the time window for the queue in response to the arrival time being outside the time window.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
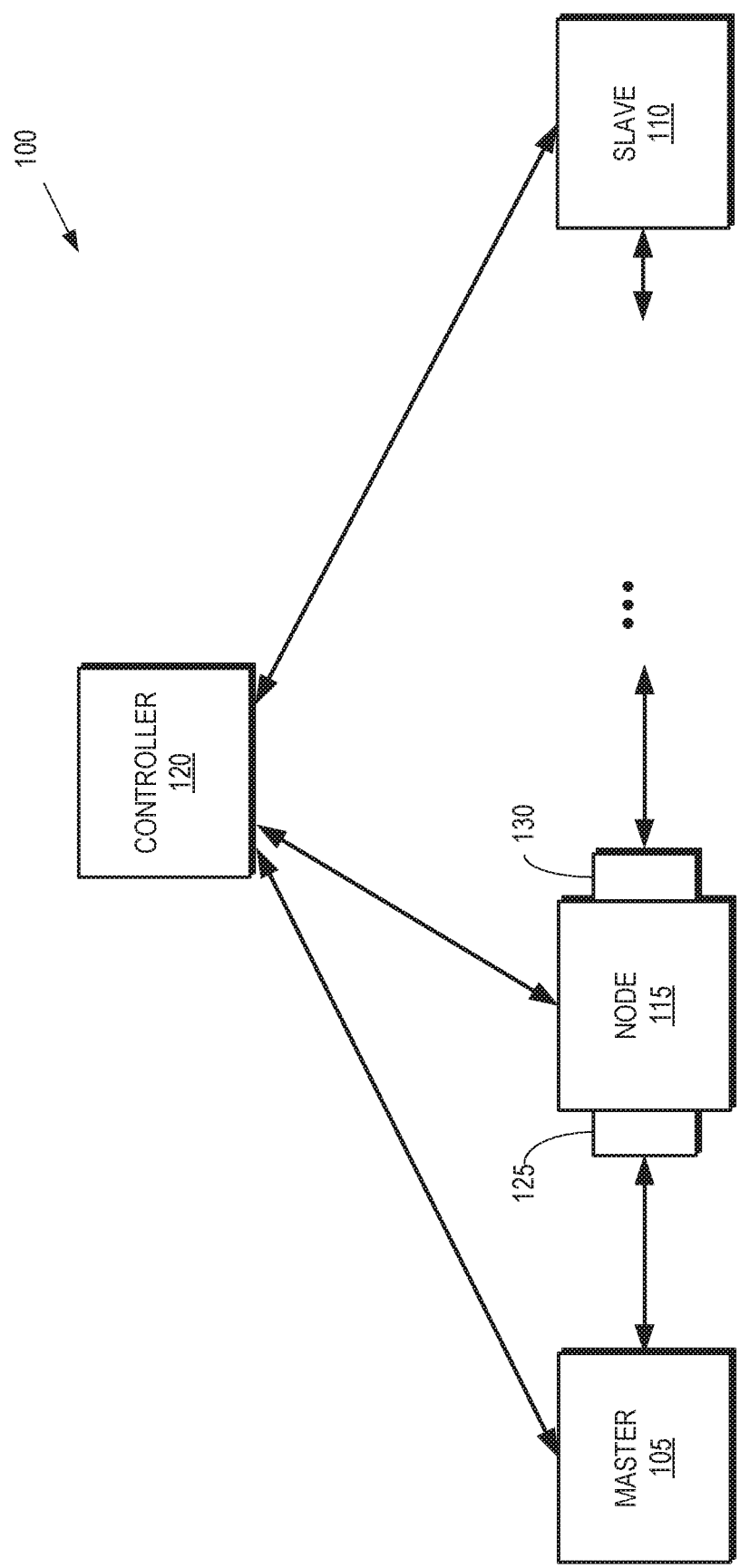
FIG. 1 is a block diagram of a communication system that includes a master device and a slave device according to some embodiments.

Conventional communication systems use point to point communication (e.g. common public radio interface, CPRI) to transfer data between a core network and a signal processing unit (e.g., through the "backhaul" network) and between the signal processing unit and a base station (e.g., through the "fronthaul" network). The best state of the art communication systems use statistical multiplexing to transfer the same data, e.g., CPRI over Ethernet. However, statistical multiplexing does not support low latency communication due to collisions between packets at nodes in the network (e.g., ethernet switches) and buffering of packets at the nodes. Furthermore, statistical multiplexing does not deliver proper slice isolation in systems that employ network slicing and a given resource could be required at the same time by two different services. For example, two services implemented using different network slices could use the same resources to forward packets.

In order to meet the stringent latency requirements of ULLRC and C-RAN, as well as supporting network slicing, communication systems are configured to perform "deterministic networking" in which packet arrival times and latencies are known accurately in advance. One deterministic networking technique is time-aware shaping of packets that are scheduled for transmission by a transmission scheduler that selects packets for scheduling from a set of ingress queues. A gate control list (GCL) identifies the ingress queues that are considered by the transmission scheduler in a sequence of time intervals that are referred to as traffic windows. The pattern of ingress queues that are considered in each traffic window is referred to as a gate control entity (GCE). The GCL is therefore a list of GCEs for the sequence of traffic windows.

Different flows are mapped to different ingress queues. The GCL defines time-aware traffic windows in which only packets from ingress queues corresponding to specified flows are allowed to be transmitted. For example, the GCL can be configured so that only a first queue associated with a first flow is considered by the scheduler in a time window that corresponds to the time that a first frame in the first flow is expected to arrive in the first queue. All other queues are closed by the GCL in that time window. The scheduler then schedules the only available frame—the first frame in the first queue—for transmission, thereby avoiding collisions and the resulting transmission delays. In some cases, time-aware scheduling allows lower priority frames to be transmitted if the lower priority frames do not collide with a higher priority frame that would be admitted in the next time-aware traffic window. As long as no other frames of the same or higher priority (or lower priority frames that are expected to collide with the first frame) are considered for transmission at the time that the first frame arrives in the first queue, transmission of the first frame is deterministic and proceeds with minimal latency and no jitter.

Frames in flows that are assigned to ingress queues of a node for deterministic or time-aware scheduling do not always arrive at the ingress queue during the time-aware traffic windows defined by a GCL. For example, a relative shift between the clocks used at a frame emitter and the node can result in frames arriving at the node outside of the expected time window. Frames that arrive before a window for the queue has been opened, or after the window for the queue has been closed, are buffered in the queue until the next window opens. The frame is then transmitted in the next available window indicated in the GCL. Buffering frames that arrive at unexpected times adds latency and prevents the node from enforcing jitter requirements for the time-aware flow. The temporal misalignment of the frames and the GCL can persist for an extended time interval, e.g., if the temporal misalignment is due to a clock shift. Moreover, frames that arrive at the same queue as the buffered frame are delayed while waiting for the buffered frame to be transmitted in the next available time window.

FIGS. 1-9 disclose techniques for reducing latency and jitter caused by frames arriving at a queue of a node outside of a time window allocated for time-aware scheduling of flows associated with the queue. The techniques include monitoring an arrival time of a frame at the queue, determining whether the arrival time is within a time window for the queue, and generating a signal in response to the arrival time being outside of the time window. In some embodiments, a module implemented in the node is configured to monitor a plurality of queues and generate the signal based on arrival times at the plurality of queues. For example, a first submodule can be configured to monitor arrival times of frames at a queue and a second submodule can be configured to compare the arrival times to a time window defined for the queue by a gate control entity (GCE) in a gate control list (GCL). The first submodule records events that indicate arrival times of the frames at the plurality of queues and the second submodule determines whether to take an action in response to an arrival time of a frame being outside of a time window for a corresponding one of the plurality of queues. For example, the second submodule is configured to generate a signal indicating an alert or an action to take in response to the arrival time for the frame being outside of the time window for the corresponding queue. In some embodiments, the action includes modifying the time window for the queue by adapting the GCE to open the gate for the queue during an additional time window that is determined based on the arrival time.

FIG. 1 is a block diagram of a communication system 100 that includes a master device 105 and a slave device 110 according to some embodiments. The master device 105 and the slave device 110 implement deterministic networking so that packet arrival times and latencies are known accurately in advance. Some embodiments of the master device 105 and the slave device 110 are therefore configured to perform time-aware shaping of packets that are scheduled for transmission by a transmission scheduler that selects packets for scheduling from a set of ingress queues (or, in some cases, egress queues). Packets that are conveyed between the master device 105 and the slave device 110 traverse one or more nodes. In the illustrated embodiment, the communication system 100 includes node 115 that is deployed between the master device 105 and the slave device 110. However, more or fewer nodes are implemented between the master device 105 and the slave device 110 in some embodiments.

In the illustrated embodiment, the communication system 100 implements a controller 120 such as a software defined networking (SDN) controller. The controller 120 exchanges signaling with the master device 105, the slave device 110, and the node 115 to coordinate operation of these entities in the communication system 100. For example, the controller 120 can provide signals indicating the beginning and ending of extended time intervals that are used to perform timing synchronization between the master device 105 and the slave device 110, as discussed herein. However, the communication system 100 is not required to implement a controller 120 in order to perform some embodiments of the time-aware shaping disclosed herein.

The node 115 includes one or more ingress ports 125 and egress ports 130. Although the ingress port 125 and the egress port 130 are shown as physical elements in FIG. 1, some embodiments of the node 115 implement the ingress port 125 and the egress port 130 as virtual elements, e.g., using port numbers instead of different physical ports. Frames are received from the master device 105 at the ingress port 125 and are forwarded downstream towards the slave device 110 from the egress port 130. As discussed herein, the node 115 implements time sensitive networking (TSN) using one or more queues that transmit frames during time windows defined by a GCE in a GCL maintained by the node 115. However, the frames associated with a queue do not always arrive during the time windows defined by the GCL. For example, if the master device 105 is transmitting frames to the node 115, a relative shift between the clocks used at the master device 105 and the node 115 can result in frames arriving at the node 115 outside of the time window defined for the queue that receives the frame in the node 115.

The node 115 is configured to monitor arrival times of frames arriving for the queues maintained by the node 115. Some embodiments of the node 115 are configured to monitor the arrival times using information stored in a configuration database and the node 115 stores the arrival times in an event database for subsequent analysis. The node 115 compares the arrival times for the frames to the time intervals defined for the corresponding queues. Frames that arrive outside of the time windows defined for their corresponding queues are detected by the node 115. In response to detecting a frame arriving outside of the time window for the corresponding queue, the node 115 generates signaling to indicate a mismatch between the arrival time of the frame and the time window defined for the corresponding queue. Some embodiments of the node 115 use the signal internally (e.g., to modify the time windows defined by the GCL) or provide the signal to the controller 120, which can take action based on the signal received from the node 115.

Figure 2:
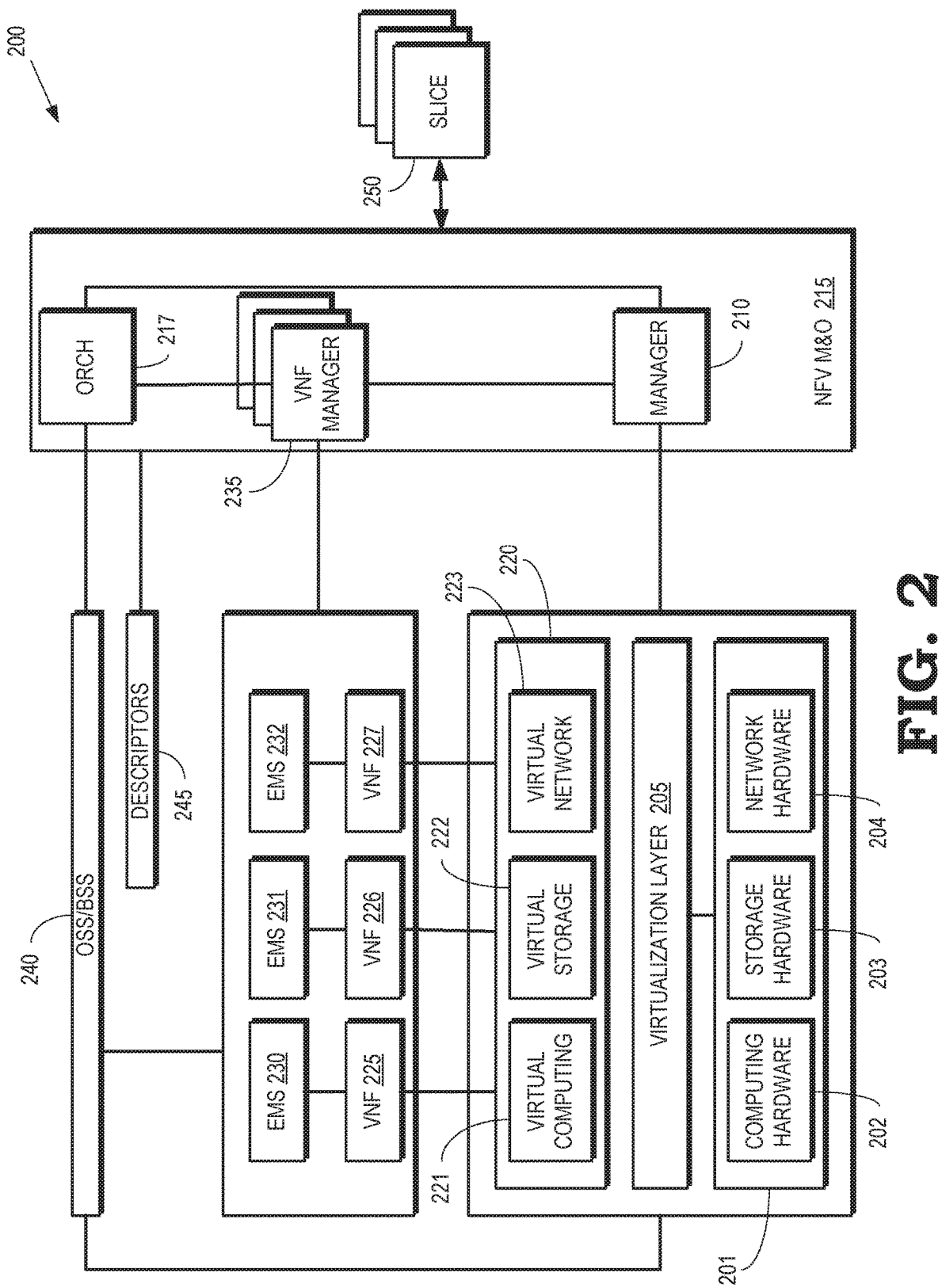
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. For example, the NFV architecture 200 is used to implement some embodiments of the controller 120 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing resources 221, virtual storage resources 222, and virtual networking resources 223.

Virtual networking functions (VNF) 225, 226, 227 execute on the NFV infrastructure (e.g., the hardware resources 201) and utilize the virtual resources 220. For example, the virtual networking functions 225-227 use virtual machines supported by the virtual computing resources 221, virtual memory supported by the virtual storage resources 222, or virtual networks supported by the virtual network resources 223. Element management systems (EMS) 230, 231, 232 are responsible for managing the virtual networking functions 225-227. For example, the element management systems 230-232 may be responsible for fault and performance management. In some embodiments, each of the virtual networking functions 225-227 is controlled by a corresponding VNF manager 235 that exchanges information and coordinates actions with the manager 210 or the orchestrator 217.

The NFV architecture 200 may include an operation support system (OSS)/business support system (BSS) 240. The OSS/BSS 240 deals with network management including fault management using the OSS functionality. The OSS/BSS 240 also deals with customer and product management using the BSS functionality. Some embodiments of the NFV architecture 200 use a set of descriptors 245 for storing descriptions of services, virtual network functions, or infrastructure supported by the NFV architecture 200. Information in the descriptors 245 may be updated or modified by the NFV M&O 215.

The NFV architecture 200 can be used to implement network slices 250 that provide user plane or control plane functions. A network slice 250 is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
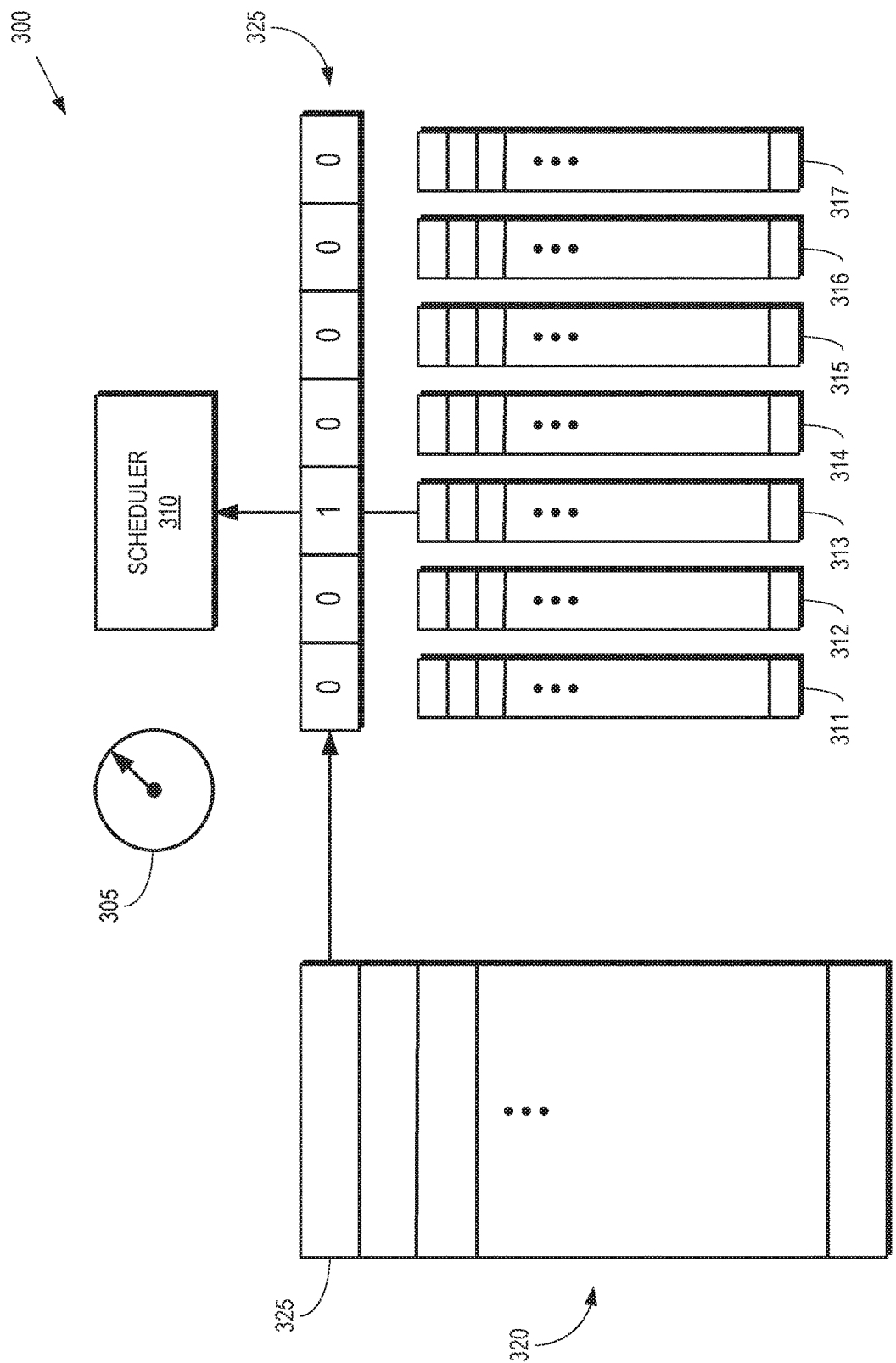
FIG. 3 is a block diagram of a node that performs time-aware shaping of frames that are received at an ingress port of the node according to some embodiments.

FIG. 3 is a block diagram of a node 300 that performs time-aware shaping of frames that are received at an ingress port of the node 300 according to some embodiments. The node 300 is used to implement some embodiments of the node 115 shown in FIG. 1. The node 300 includes a clock 305 that establishes timing of functions executed in the node 300. The node 300 also includes a scheduler 310 that schedules packets for transmission from a set of queues 311, 312, 313, 314, 315, 316, 317, which are collectively referred to herein as "the queues 311-317."

The scheduler 310 performs time-aware shaping of the packets in the queues 311-317. Some embodiments of the scheduler 310 operate according to standards defined by IEEE 802.1 TSN group such as 802.1Qbv Time-Aware Shaper (TAS). In order to perform time-aware shaping, the queues 311-317 are associated with different flows. Some embodiments of the flows are time sensitive networking (TSN) flows (or data link flows) that are characterized by quality of service (QoS) properties (e.g., bandwidth and latency) for the traffic class of the flow. For example, a TSN flow is defined by the priority code point (PCP) field and VLAN ID (VID) within the 802.1Q VLAN tag in an Ethernet header.

The node 300 includes a gate control list (GCL) 320 that defines, for successive time intervals, which queues 311-317 are considered by the scheduler 310. The subsets of the queues 311-317 that are available for scheduling by the scheduler 310 in each time interval are defined by gate control entities (GCE) 325 (only one indicated by a reference numeral in the interest of clarity). The gate control entity 325 includes information that determines the subsets of the queues 311-317 that are available for scheduling. For example, a value of (0) in an entry of the gate control entity 325 indicates that a gate for the corresponding queue is closed and the scheduler 310 does not schedule frames that are buffered in the queue for transmission. A value of (1) in an entry of the gate control entity 325 indicates that a gate for the corresponding queue is open and the scheduler 310 schedules one or more frames in the queue for transmission. A gate is open for a time interval that is referred to as the time-aware traffic window. Frames are therefore transmitted according to the patterns defined by the gate control list 320 and transmission selection decisions made by the scheduler 310.

The gate control list 320 and the gate control entities 325 are used to define time-aware traffic windows in which only some specific flows are allowed to be transmitted. The frames from the other flows that are received within the considered time window are then queued or buffered for subsequent transmission. In the illustrated embodiment, the gate control entity 325 opens the gate for the queue 313 and closes the gate for the remaining queues 311, 312, 314-317. Thus, the scheduler 310 only schedules packets or frames from the queue 313 during a time interval associated with the gate control entity 325. The time intervals for gate control entities including the gate control entity 325 are indicated by a beginning time and an ending time. For example, the gate control entity 325 is applied when the clock 305 indicates a time that corresponds to a beginning time for the gate control entity 325. The node switches from the gate control entity 325 to a subsequent gate control entity when the clock 305 indicates a time that corresponds to an ending time for the gate control entity 325, which corresponds to a beginning time for the subsequent gate control entity. The beginning time and the ending time can be indicated in absolute times or in relative times.

Some embodiments of the node 300 implement a version of TAS that allows transmission of a lower priority frame (e.g., a frame from one of the queues 311, 312, 314-317) if the lower priority frame will not collide with a higher priority frame that would be emitted in a next time-aware traffic window, e.g., a frame from the queue 313. The scheduler 310 therefore implements a strict scheduling algorithm that prevents another frame of the same of higher priority from being under transmission concurrently with a higher priority frame arriving at the queue 313, which leads a deterministic transmission of frames.

Frames that arrive at the node 300 when the corresponding queue is closed are buffered until the next time-aware traffic window for the queue. For example, if a frame arrives in the queue 311 while the GCE 325 has closed the queue 311, the frame is buffered in the queue 311 until a subsequent GCE from the GCL 320 opens the queue 311. Buffering of frames increases the latency of the frame because the frame has to wait for the next time-aware traffic window. Buffering a frame can also have a ripple effect on subsequently received frames that have to wait for a previously received frame to be transmitted before they can be transmitted. For example, if a frame is buffered in the queue 311 during a time-aware traffic window for the queue 311, frames that are subsequently received in the queue 311 are not transmitted until the previously buffered frame has been transmitted, which may be during the next time-aware traffic window or may be delayed until a subsequent time-aware traffic window. Buffering of frames that arrive outside of the time-aware traffic windows for their queues also makes it difficult to control jitter of frames in the associated flows.

Figure 4:
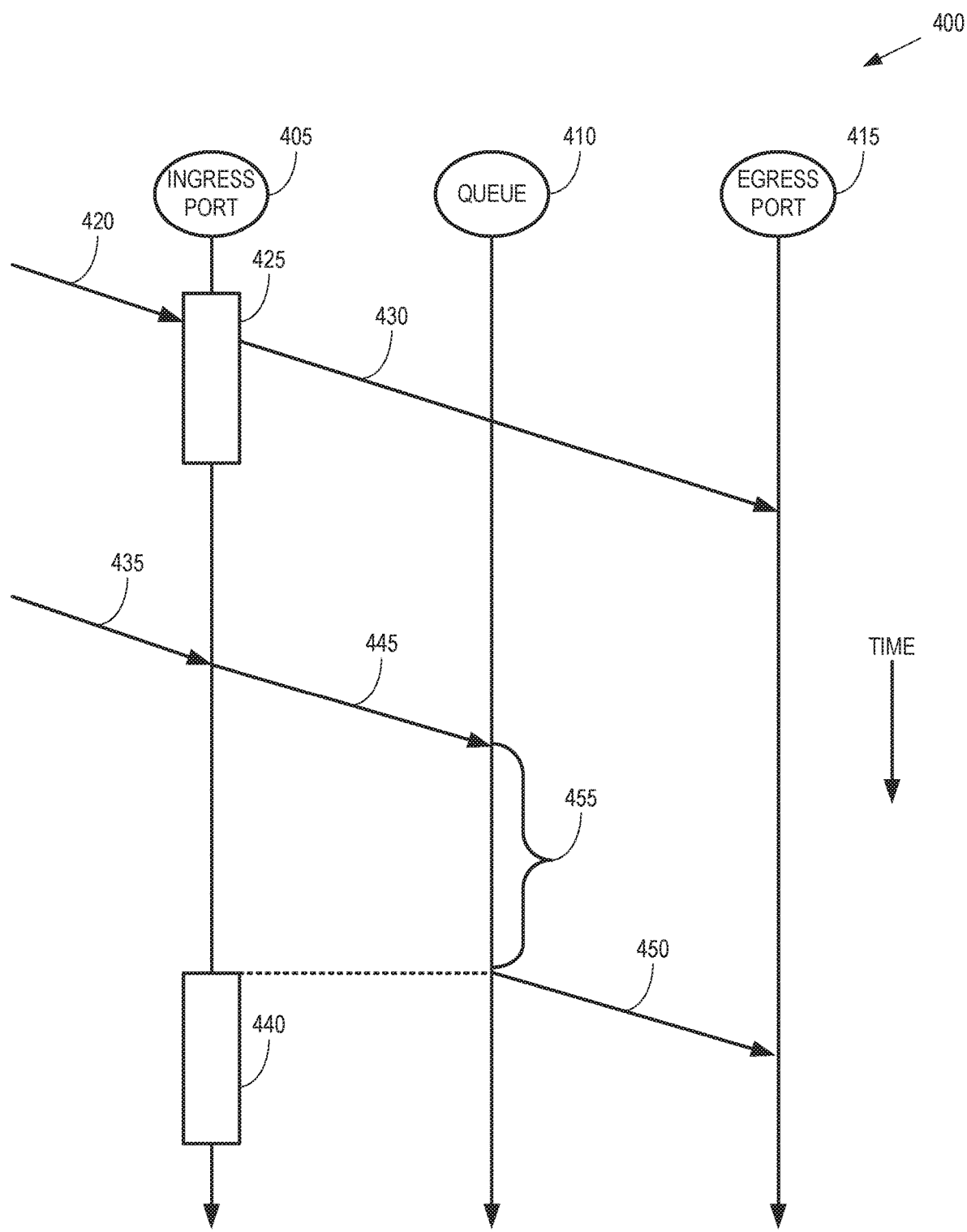
FIG. 4 is a timing diagram that illustrates arrival of frames within a time-aware traffic window and outside of a time-aware traffic window according to some embodiments.

FIG. 4 is a timing diagram 400 that illustrates arrival of frames within a time-aware traffic window and outside of a time-aware traffic window according to some embodiments. The timing diagram 400 represents transmission of frames in some embodiments of the communication system 100 shown in FIG. 1, a communication system implemented using the NFV architecture 200 shown in FIG. 2, and the node 300 shown in FIG. 3. The timing diagram 400 shows events that occur at an ingress port 405 of a node, a queue 410 in the node, and an egress port 415 of the node. Time increases downward in FIG. 4.

In the illustrated embodiment, a first frame arrives (as indicated by the arrow 420) at the ingress port 405 during a time-aware traffic window 425 for a queue associated with a flow that includes the first frame. Since the time-aware traffic window 425 is open at the arrival time of the first frame, the node forwards (as indicated by the arrow 430) the first frame to the egress port 415 and the first frame is transmitted from the node to the next destination in the network via the egress port 415.

In the illustrated embodiment, a second frame arrives (as indicated by the arrow 435) at the ingress port 405 prior to opening of a time-aware traffic window 440 for the queue associated with a flow that includes the second frame. The flow that includes the second frame can be the same as or different than the flow that includes the first frame. The second frame is buffered by the node (as indicated by the arrow 445) in the queue 410 until the time-aware traffic window 440 is opened. In response to the time-aware traffic window 440 opening, the second frame is forwarded (as indicated by the arrow 450) to the egress port 415 for transmission. Thus, latency of the second frame is increased because the second frame is required to wait for at least a delay 455 until the second time-aware traffic window 440 opens. In some cases, the delay 455 is increased by the presence of other frames that are buffered in the queue 410 and awaiting transmission during the second time-aware traffic window 440.

Figure 5:
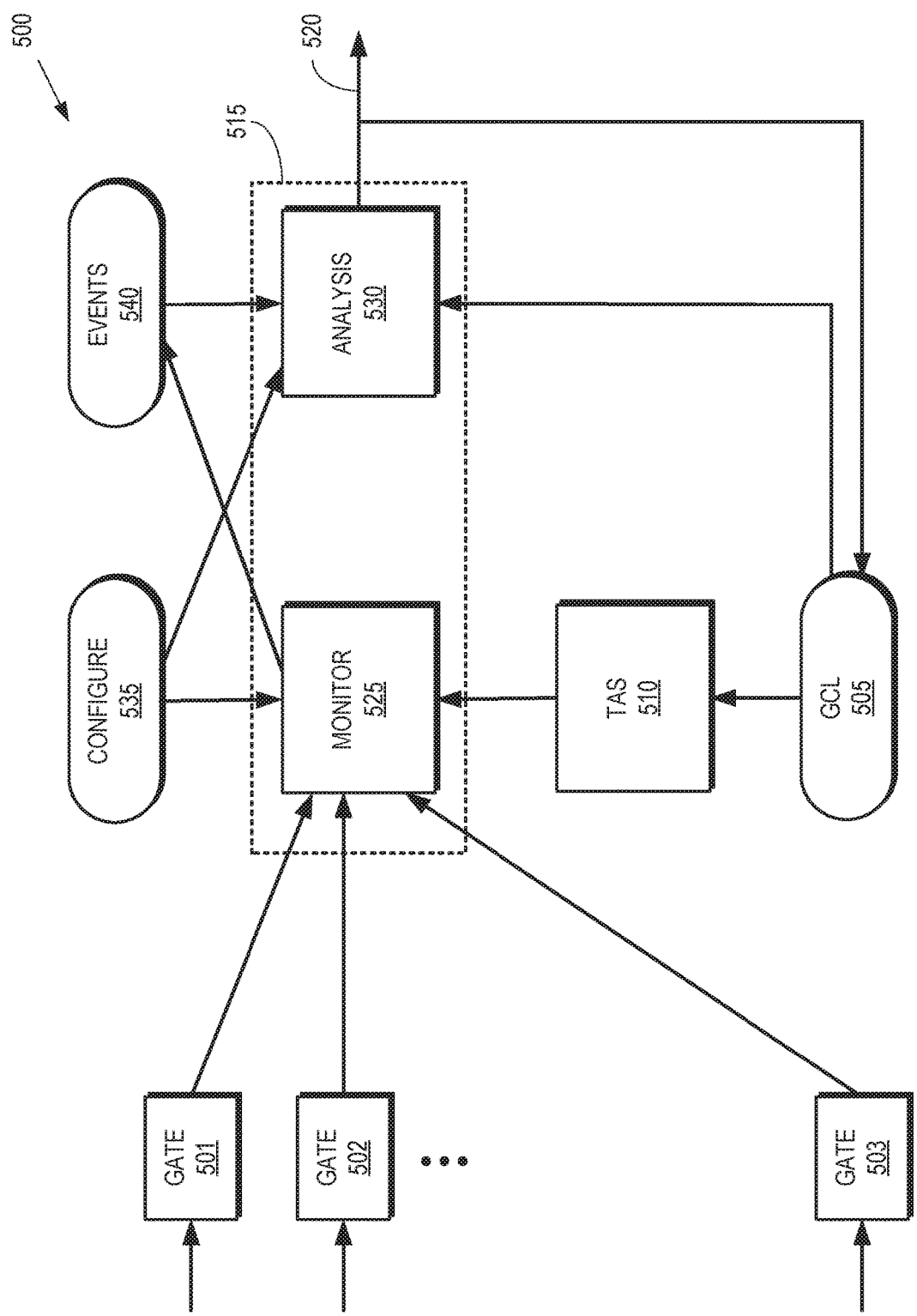
FIG. 5 is a block diagram of a node that monitors frame arrival times and detects mismatches between the arrival times and time-aware traffic windows according to some embodiments.

FIG. 5 is a block diagram of a node 500 that monitors frame arrival times and detects mismatches between the arrival times and time-aware traffic windows according to some embodiments. The node 500 is used to implement some embodiments of the node 115 shown in FIG. 1 and the node 300 shown in FIG. 3. The node 500 includes a set of gates 501, 502, 503 (collectively referred to herein as "the gates 501-503") that are selectively opened and closed in different time intervals, e.g., according to GCE values that are determined by a GCL 505. The gates 501-503 are associated with corresponding queues (not shown in FIG. 5 in the interest of clarity) such as the queues 311-317 shown in FIG. 3. Frames (or packets) that arrive at the node 500 are stored in the queues and then transmitted substantially immediately if the corresponding gates 501-503 are opened or buffered if the corresponding gates are closed.

The node 500 includes a time-aware shaper (TAS) 510 that controls scheduling of frames in the queues associated with the gates 501-503 based on the GCE values in the GCL 505. Some embodiments of the GCL 505 include a list of GCEs that define different subsets of the gates 501-503 that are opened to allow transmission of the frames that arrive in the corresponding queues. The GCL 505 also includes information that defines a set of successive time intervals for applying the GCE values. For example, the GCL 505 can define a first GCE that is applied for 500 µs, a second GCE that is applied for 300 µs, and a third GCE that is applied for 200 µs. In that case, the duration of the GCL 505 is one second and the GCL 505 is repeated iteratively every second to define the subsets of the gates 501-503 that are opened by the TAS 510.

A module 515 that monitors arrival times of frames (or packets) at the gates 501-503 and determines whether the arrival times are within the time-aware traffic windows assigned to the corresponding queues by the GCE that is active when the frame (or packet) arrives at the node 500. The module 515 generates signals in response to the arrival times being outside of the time-aware traffic windows assigned to the corresponding queue, as indicated by the arrow 520. As discussed herein, the signal 520 is provided to an external entity, to the GCL 505 for modifying one or more GCEs, or to other entities. Some embodiments of the module 515 include a monitoring submodule 525 and an analysis submodule 530, which are configured using information in a configuration database 535. The configuration information identifies one or more of the queues associated with the gates 501-503 that are to be monitored by the monitoring module 525 and actions that are to be taken in response to a frame (or packet) arriving at the monitored queue when the corresponding gates 501-503 is closed.

In response to a frame or packet arriving at the monitored queue, the monitoring submodule 525 records an identifier of the queue, the current GCE, and a time relative to a beginning time of the GCL 505. The packet arrival information is stored in an entry of an event database 540. The analysis submodule 530 accesses events in the event database 540. The events are accessed periodically at a predetermined periodicity, in response to occurrence of an event or a predetermined number of events, or at other times. Some embodiments of the analysis submodule 530 compare arrival times indicated in the entries of the event database 540 to the time-aware traffic windows of the queues that are indicated in the entry. The analysis submodule 530 does not take any action or generate a signal as long as the arrival times are within the corresponding time-aware traffic windows. The analysis submodule 530 generates the signal 520 that indicates an alert or action to be taken in response to an arrival time for a frame (or packet) arriving outside of the time-aware traffic window for its queue.

Figure 6:
FIG. 6 illustrates a configuration database, a gate control list (GCL), and an event database according to some embodiments.
Figure 6:

FIG. 6 illustrates a configuration database 600, a gate control list (GCL) 601, and an event database 602 according to some embodiments. The configuration database 600, GCL 601, and event database 602 represent some embodiments of the configuration database 535, GCL 505, and event database 540 shown in FIG. 5.

The configuration database 600 includes a first column that holds identifiers for the records in the configuration database 600, a second column that holds information indicating a queue in a node that is to be monitored by the monitoring submodule configured using the configuration database 600, and a third column that holds information indicating an action to be taken in response to an analysis submodule determining that an arrival time of a frame (or packet) at the corresponding queue is outside of a time-aware traffic window for the queue. For example, the first record (1) includes a field that indicates that queue 2 is to be monitored and, in response to a frame (or packet) arriving at queue 2 outside of the corresponding time-aware traffic window, another field indicates that an alert signal is to be generated. In some embodiments, the alert signal is sent to the node that is emitting the frames (or packets) to inform the node of the mismatch between the arrival time and the time-aware traffic window for the corresponding queue. For another example, the second record (2) includes a field that indicates that queue 4 is to be monitored and, in response to a frame (or packet) arriving at queue 4 outside of the corresponding time-aware traffic window, another field indicates that an alert signal is to be generated. For yet another example, the third record (3) includes a field that indicates that queue 5 is to be monitored and, in response to a frame (or packet) arriving at queue 5 outside of the corresponding time-aware traffic window, another field indicates an adaptation that is to be performed. Examples of adaptations include generating new GCE for the GCL 601, modifying existing GCE in the GCL 601, and the like.

The GCL 601 includes entries for the GCE that are applied to gates/queues of the node. A first column holds an identifier of the corresponding GCE, a second column holds a value of the GCE that indicates subsets of the gates/queues that are open or closed, and a duration of the GCE. In the illustrated embodiment, the GCL 601 defines GCE that open or close a set of eight gates/queues over a time interval of one second. The first GCE (identifier 1) has a value of 00100011 that indicates that the third, seventh, and eighth gates are open during the first 100 µs of the GCL 601. The second GCE (identifier 2) has a value of 00101100 that indicates that the third, fifth, and sixth gates are open during the next 600 µs of the GCL 601. The third GCE (identifier 3) has a value of 11010000 that indicates that the first, second, and fourth gates are open during the last 300 µs of the GCL 601. The GCL 601 iteratively repeats every second.

The event database 602 stores entries in response to arrival of frames (or packets) at the node. A first column indicates an identifier of the record or entry, a second column indicates a queue that generated the entry, a third column including the GCE for the queue and an indication of whether the corresponding gate/queue was open or closed at the arrival time, and a third column indicating the arrival time of the frame or packet. For example, record 1 indicates an event for queue 2 that was generated in response to a packet arriving at a time of 85 µs (relative to the beginning time of the GCL 601). The third field of record 1 indicates that the queue 2 was closed by the GCE when the frame (or packet) arrived at the node, as indicated by the dashed box 605. For another example, record 2 indicates an event for queue 5 that was generated in response to a packet arriving at a time of 112 µs (relative to the beginning time of the GCL 601). The third field of record 2 indicates that the queue 5 was opened by the GCE when the frame (or packet) arrived at the node, as indicated by the dashed box 610.

Figure 7:
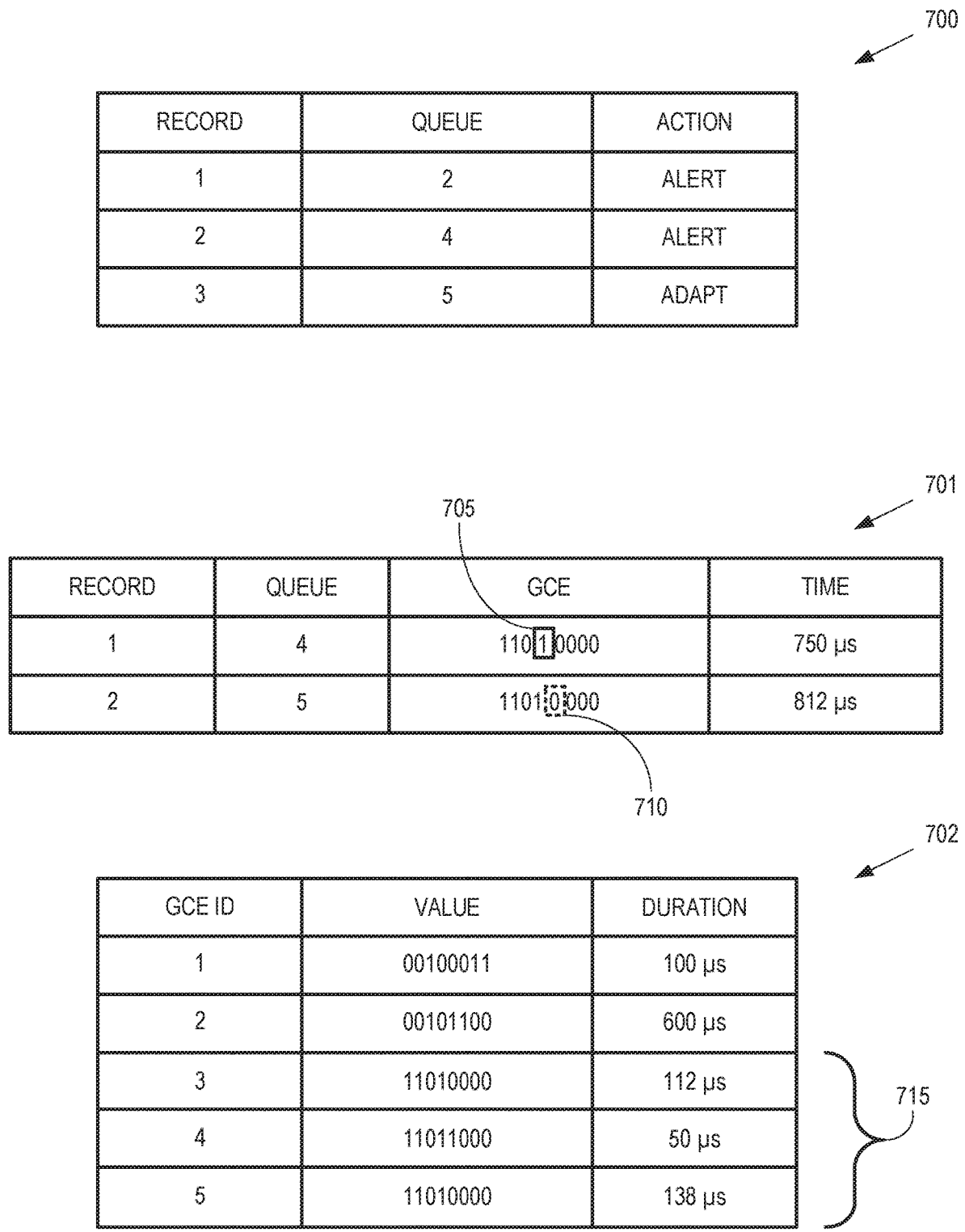
FIG. 7 illustrates a configuration database, an event database, and a modified gate GCL according to some embodiments.

FIG. 7 illustrates a configuration database 700, an event database 701, and a modified gate control list (GCL) 702 according to some embodiments. The configuration database 700, event database 701, and modified GCL 702 represent some embodiments of the configuration database 535, event database 540, and GCL 505 in the node 500 shown in FIG. 5. Initially, the node operates according to a version of the GCL that corresponds to the GCL 601 shown in FIG. 6. However, as discussed below, the GCL 601 is modified in response to a mismatch between an arrival time and a time aware traffic window that is defined by the GCL 601. The modified GCL 702 represents a modified version of the GCL 601 shown in FIG. 6.

The event database 701 includes a first record that is generated in response to a first frame (or packet) arriving at queue 4 at an arrival time of 750 µs relative to the beginning of the GCL, which is initially using values of a GCE as indicated in the GCL 601 shown in FIG. 6. At the arrival time of 750 µs, the GCL 601 indicates that the GCE 3 is active. The GCE 3 opens queue 4 and the first frame (or packet) arrives at queue 4 while queue 4 is open, as indicated by the solid block 705. Consequently, no action or signal is necessary. A second record is generated in response to a second frame (or packet) arriving at queue 5 had an arrival time of 812 µs relative to the beginning of the GCL, which is using values of the GCE as indicated in the GCL 601 shown in FIG. 6 when the second frame (or packet) arrives. At the arrival time of 812 µs, the GCL 601 indicates that the GCE 3 is active. The GCE 3 closes queue 5 and the second frame (or packet) arrives at queue 5 while queue 5 is closed, as indicated by the dashed block 710. The second frame (or packet has therefore arrived outside of the time-aware traffic window for queue 5. In response to the mismatch, the monitoring module generates a signal indicating that an adaptation is to be performed.

In the illustrated embodiment, the GCL 702 is modified in response to the adaptation signal. As discussed above, the GCL 702 initially includes values of the GCE that correspond to the values indicated in the GCL 601 shown in FIG. 6. The GCL 702 is modified relative to the GCL 601 by subdividing the original GCE 3 (indicated by the bracket 715) from GCL 601 into three new GCE indicated by the identifiers 3-5. The new GCE 3 opens the first, second, and fourth queues for a duration of 112 µs, the new GCE 4 opens the first, second, fourth, and fifth queues for a duration of 50 µs, and the new GCE 5 opens the first, second, and fourth queues for a duration of 138 µs. The sum of the durations of the GCE 3-5 is equal to the sum of the original GCE 3 (as indicated by the bracket 715) so that the duration of the modified GCL 702 is equal to the duration of the original GCL 601.

Figure 8:
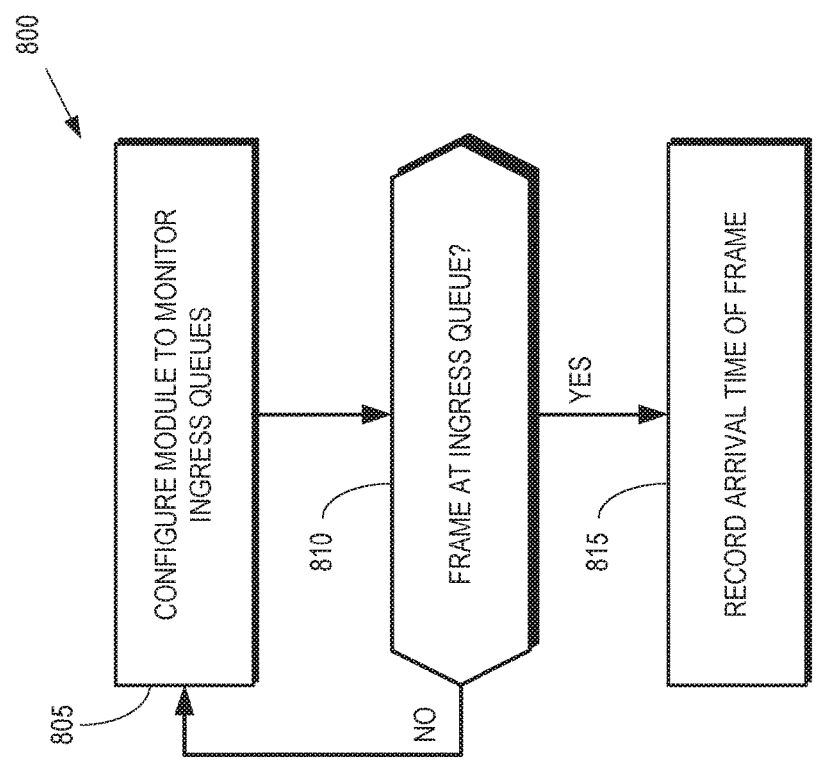
FIG. 8 is a flow diagram of a method of monitoring arrival times of frames (or packets) according to some embodiments.

FIG. 8 is a flow diagram of a method 800 of monitoring arrival times of frames (or packets) according to some embodiments. The method 800 is implemented in some embodiments of the node 115 shown in FIG. 1, the node 300 shown in FIG. 3, and the monitoring submodule 525 shown in FIG. 5.

At block 805, the module is configured to monitor ingress queues at the node, e.g., using information stored in a configuration database. At block 810, the module determines whether a frame (or packet) has arrived at one of the ingress queues that are being monitored by the module. If not, the method 800 flows back to block 805 and the module continues to monitor the ingress queues. If a frame (or packet) has arrived at one of the ingress queues, the method 800 flows to block 815 and the module records the arrival time of the frame (or packet) in any event database. As discussed herein, the module also records information indicating the queue that received the frame (or packet) and a GCE that indicates whether the corresponding queue was open or closed when the frame (or packet) arrived.

Figure 9:
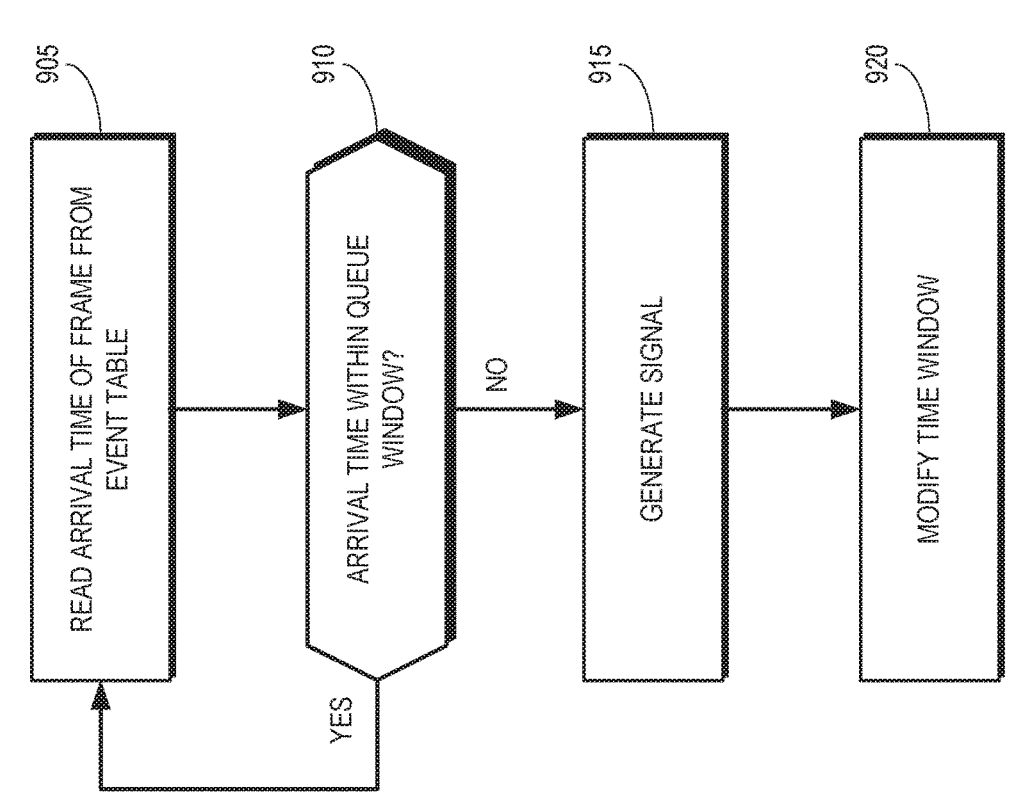
FIG. 9 is a flow diagram of a method of analyzing arrival times of frames (or packets) at corresponding gates or queues according to some embodiments.

FIG. 9 is a flow diagram of a method 900 of analyzing arrival times of frames (or packets) at corresponding gates or queues according to some embodiments. The method 900 is implemented in some embodiments of the node 115 shown in FIG. 1, the node 300 shown in FIG. 3, and the analysis submodule 530 shown in FIG. 5.

At block 905, the analysis submodule accesses an arrival time of a frame (or packet) from an event table. The analysis submodule also accesses information identifying a time-aware traffic window for the gate/queue that received the frame (or packet). As discussed herein, entries in the event table are generated by a corresponding monitoring submodule. At block 910, the analysis submodule determines whether the arrival time is within the corresponding time-aware traffic window. If so, the analysis submodule does not need to generate in a signal or take any action. The method 900 therefore flows back to block 905. If the arrival time is outside of the corresponding time-aware traffic window, the method 900 flows to block 915.

At block 915, the analysis submodule generates a signal using information stored in a configuration database. In some embodiments, the signal indicates an alert that is transmitted to other entities or an action/adaptation that is to be performed by one or more other entities. For example, the signal can indicate that a GCL is to be modified (at block 920) to open the gate/queue during an additional time-aware traffic window that is determined based on the arrival time indicated in the entry of the event table. However, the block 920 is an optional step that is not performed in some embodiments of the method 900.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
 a. hardware-only circuit implementations (such as implementations and only analog and/or digital circuitry) and
 b. combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
 hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
 monitoring an arrival time of a frame at a node that selectively transmits frames from different flows in different time windows;
 determining whether the arrival time is within a time window indicated by a gate control list (GCL) stored in the node;
 accessing the GCL to determine whether the arrival time is within the time window; and
 generating a signal in response to the arrival time being outside of the time window.

2. The method of claim 1, wherein generating the signal comprises generating a signal indicating an alert that the arrival time is outside the time window or an adaptation to be performed by the node in response to the arrival time being outside the time window.

3. The method of claim 2, further comprising:
 buffering the frame in response to the arrival time being outside the time window.

4. The method of claim 2, further comprising:
modifying the time window for the queue in response to the arrival time being outside the time window.

5. A method comprising:
monitoring an arrival time of a frame at a queue in a node that selectively transmits frames from different flows in different time windows;
determining whether the arrival time is within a time window;
generating a signal in response to the arrival time being outside of the time window;
configuring a first submodule to monitor an arrival time of the frame using information stored in a configuration database; and
configuring a second submodule to compare the arrival time to a time window for the queue using information stored in the configuration database.

6. The method of claim 5, further comprising:
receiving the frame at an ingress port of the node; and
recording, using the first submodule, the arrival time of the frame in an event database in response to receiving the frame at the ingress port.

7. The method of claim 6, further comprising:
accessing, at the second submodule, the arrival time from the event database; and
determining, at the second submodule, whether the arrival time is within the time window for the queue.

8. A node of a communication system, wherein the node that selectively transmits frames from different flows in different time windows, the node comprising:
a port to receive a frame;
a queue to hold the frame received at the port;
a module to determine whether an arrival time of the frame is within a time window for the queue and generate a signal in response to the arrival time being outside of the time window; and
a memory configured to store a gate control list (GCL) that includes information indicating the time window for the queue, and wherein the module is configured to access the information indicating the time window for the queue from the GCL in the memory.

9. The node of claim 8, wherein the module is configured to generate the signal to indicate an alert that the arrival time is outside the time window or an adaptation to be performed by the node in response to the arrival time being outside the time window.

10. The node of claim 9, wherein the frame is buffered in the queue in response to the arrival time being outside the time window.

11. The apparatus of claim 9, wherein the module modifies the time window for the queue in response to the arrival time being outside the time window.

12. A node of a communication system, wherein the node that selectively transmits frames from different flows in different time windows, the node comprising:
a port to receive a frame;
a queue to hold the frame received at the port; and
a module to determine whether an arrival time of the frame is within a time window for the queue and generate a signal in response to the arrival time being outside of the time window, wherein the module comprises:
a first submodule to monitor an arrival time of the frame; and
a second submodule to compare the arrival time to a time window for the queue.

13. The node of claim 12, wherein the apparatus further comprises:
a configuration database stored in the memory, wherein the configuration database includes information used to configure the first submodule and the second submodule.

14. The node of claim 13, wherein the first submodule is configured to record the arrival time of the frame in an event database in response to receiving the frame at the ingress port, wherein the event database is stored in the memory.

15. The node of claim 14, wherein the second submodule is configured to access the arrival time from the event database and determine whether the arrival time is within the time window for the queue.

16. An apparatus comprising:
at least one processor; and
at least one memory including computer program code;
the at least one memory and the computer program code configured to, with the at least one processor, cause the apparatus at least to perform:
monitoring an arrival time of a frame at a queue in a node that selectively transmits frames from different flows in different time windows indicated by a gate control list (GCL) stored in the node;
determining, based on the GCL, whether the arrival time is within a time window for the queue; and
generating a signal in response to the arrival time being outside of the time window.

17. The apparatus of claim 16, wherein the at least one memory and the computer program code are configured to, with the at least one processor, cause the apparatus at least to perform:
buffering the frame in response to the arrival time being outside the time window; and
modifying the time window for the queue in response to the arrival time being outside the time window.

18. An apparatus comprising:
at least one processor; and
at least one memory including computer program code;
the at least one memory and the computer program code configured to, with the at least one processor, cause the apparatus at least to perform:
monitoring an arrival time of a frame at a queue in a node that selectively transmits frames from different flows in different time windows;
determining whether the arrival time is within a time window for the queue;
generating a signal in response to the arrival time being outside of the time window;
receiving the frame at an ingress port of the node;
recording the arrival time of the frame in an event database in response to receiving the frame at the ingress port;
accessing the arrival time from the event database; and
determining whether the arrival time is within the time window for the queue.

* * * * *